United States Patent
Fujii

(10) Patent No.: US 7,578,280 B2
(45) Date of Patent: Aug. 25, 2009

(54) FUEL INJECTION SYSTEM DESIGNED TO ENHANCE UNIFORMITY OF SIZE OF ATOMIZED PARTICLES OF FUEL

(75) Inventor: Hiroto Fujii, Kariya (JP)

(73) Assignee: Denso Corporation, Kariya, Aichi-Pref (JP)

( * ) Notice: Subject to any disclaimer, the term of this patent is extended or adjusted under 35 U.S.C. 154(b) by 0 days.

(21) Appl. No.: 11/822,276

(22) Filed: Jul. 3, 2007

(65) Prior Publication Data

US 2008/0006243 A1  Jan. 10, 2008

(30) Foreign Application Priority Data

Jul. 4, 2006  (JP)  .............................. 2006-184003

(51) Int. Cl.
*F02B 3/10* (2006.01)
(52) U.S. Cl. ...................... 123/299; 123/305; 123/478; 123/490
(58) Field of Classification Search ................ 123/299, 123/305, 478, 490
See application file for complete search history.

(56) References Cited

U.S. PATENT DOCUMENTS

| | | | |
|---|---|---|---|
| 4,777,921 A | 10/1988 | Miyaki et al. | |
| 5,199,641 A | 4/1993 | Hohm et al. | |
| 5,685,485 A | 11/1997 | Mock et al. | |
| 6,032,652 A * | 3/2000 | Nozawa et al. | 123/478 |
| 6,095,437 A * | 8/2000 | Nozawa et al. | 239/408 |
| 6,732,705 B2 * | 5/2004 | Ebelsheiser et al. | 123/299 |
| 6,739,520 B2 | 5/2004 | Ohnishi et al. | |
| 6,845,759 B2 | 1/2005 | Ohnishi et al. | |
| 7,021,278 B2 * | 4/2006 | Ishizuka et al. | 123/299 |
| 7,240,660 B1 * | 7/2007 | Bryant et al. | 123/299 |
| 2002/0157637 A1 * | 10/2002 | Reitz et al. | 123/299 |
| 2003/0056752 A1 * | 3/2003 | Sukegawa et al. | 123/305 |
| 2003/0071139 A1 * | 4/2003 | Ohnishi et al. | 239/102.2 |
| 2003/0072982 A1 | 4/2003 | Takeuchi et al. | |
| 2003/0094159 A1 | 5/2003 | Ohnishi et al. | |
| 2003/0098009 A1 * | 5/2003 | Saito et al. | 123/299 |
| 2003/0116641 A1 | 6/2003 | Ohnishi et al. | |
| 2003/0168039 A1 * | 9/2003 | Ebelsheiser et al. | 123/299 |
| 2003/0209222 A1 * | 11/2003 | Lippert et al. | 123/299 |
| 2003/0213473 A1 * | 11/2003 | Coates et al. | 123/490 |
| 2004/0080242 A1 | 4/2004 | Ohnishi et al. | |
| 2006/0094566 A1 * | 5/2006 | Keeler et al. | 477/111 |

FOREIGN PATENT DOCUMENTS

| | | |
|---|---|---|
| DE | 38 33 093 A1 | 4/1990 |
| DE | 44 09 848 A1 | 10/1995 |
| EP | 0 036 617 A2 | 9/1981 |
| JP | S62-258160 | 11/1987 |
| JP | 2003-214302 | 7/2003 |

* cited by examiner

*Primary Examiner*—Erick Solis
(74) *Attorney, Agent, or Firm*—Nixon & Vanderhye PC

(57) ABSTRACT

A fuel injection system for an internal combustion engine is provided which includes a fuel injector equipped with an actuator and a nozzle needle. The actuator works to lift the nozzle needle to inject fuel into an internal combustion engine. A controller controls an operation of the actuator to change an amount of lift of the nozzle needle a given number of times for a target injection duration, thereby ensuring the uniformity of size of atomized particles of the fuel sprayed from the fuel injector.

4 Claims, 10 Drawing Sheets

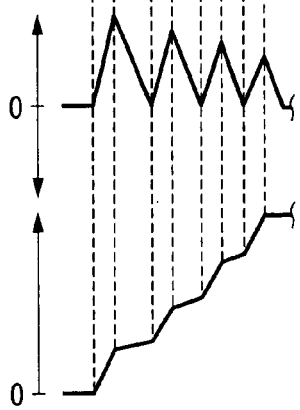
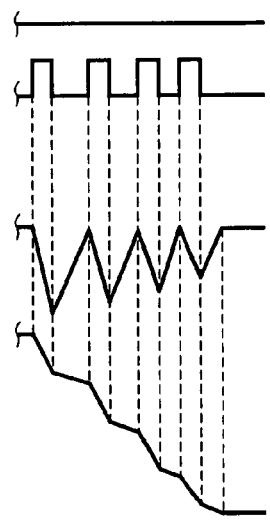
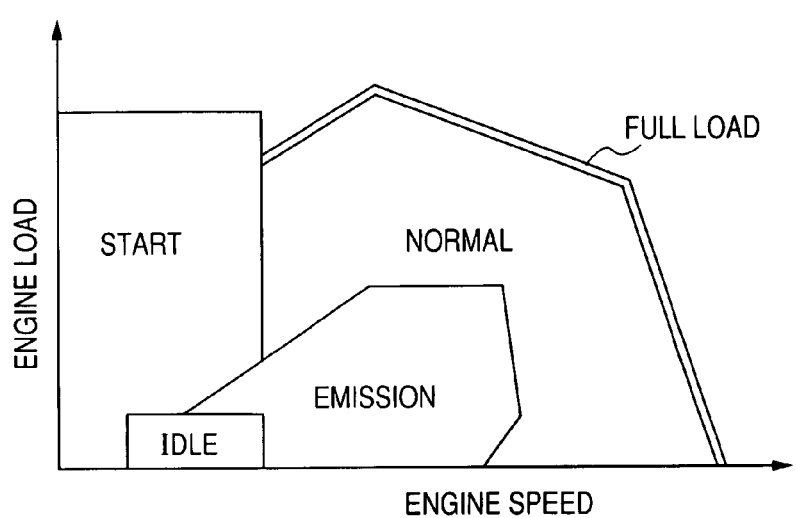
FIG. 5

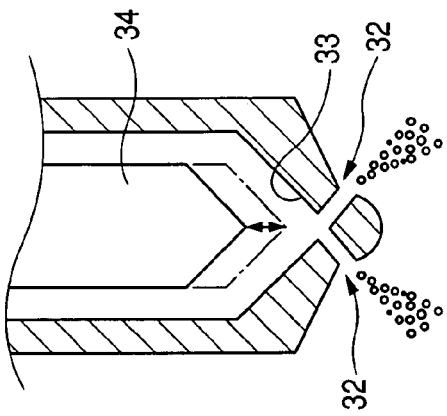
FIG. 6(a) NEEDLE FIXED
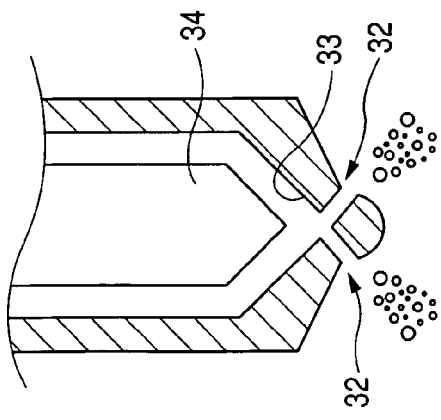
FIG. 6(b) NEEDLE OSCILLATED s<S

FUEL INJECTION SYSTEM DESIGNED TO ENHANCE UNIFORMITY OF SIZE OF ATOMIZED PARTICLES OF FUEL

CROSS REFERENCE TO RELATED DOCUMENT

The present application claims the benefit of Japanese Patent Application No. 2006-184003 filed on Jul. 4, 2006 the disclosure of which is incorporated herein by reference.

BACKGROUND OF THE INVENTION

1. Technical Field of the Invention

The present invention relates generally to a fuel injection system equipped with a fuel injector which is designed to change the amount of lift of a nozzle needle as a function of a stroke of an actuator, and more particularly to such a system designed to enhance the uniformity of the size of particles of fuel sprayed from a fuel injector.

2. Background Art

There are known common rail fuel injection systems equipped with a common rail for supplying high-pressure fuel to a fuel injector for each cylinder of a diesel engine. For instance, Japanese Patent First Publication No. 62-258160 discloses such a common rail fuel injection system which works to control the pressure of fuel to be supplied from the common rail to the fuel injector as a function of operating conditions of the engine. When the quantity of fuel sprayed from the fuel injector increases, the pressure of fuel in the common rail may be elevated to ensure the injection of fuel into the engine over a target injection duration.

The pressure of fuel in the common rail affects the shape of spray of fuel jetted from the fuel injector. The pressure of fuel in the common rail may, therefore, be regulated to achieve a desired shape of spray of fuel in order to ensure required output characteristics of the engine. The size of distributed particles of the sprayed fuel depends upon the pressure of fuel in the fuel injector, however, the particles of the sprayed fuel may be ununiform in size. It is, thus, difficult to uniform the size of all of the particles of the sprayed fuel in order to ensure the required output characteristics of the engine.

Japanese Patent First Publication No. 2003-214302 discloses the above type of conventional fuel injection system.

SUMMARY OF THE INVENTION

It is therefore a principal object of the invention to avoid the disadvantages of the prior art.

It is another object of the invention to provide a fuel injection apparatus designed to enhance the uniformity of atomized particles of fuel.

According to one aspect of the invention, there is provided a fuel injection apparatus which may be employed in automotive diesel engines. The apparatus comprises a fuel injector and a controller. The fuel injector is equipped with an actuator and a nozzle needle. The actuator works to lift the nozzle needle to inject fuel into an internal combustion engine. The controller works to control an operation of the actuator to change the amount of lift of the nozzle needle a given number of times for a target injection duration (i.e., the nozzle needle is vibrated during a fuel injection period), thereby exerting pressure pulsations on the fuel to be sprayed from a spray hole of the fuel injector to enhance the liquid column break-up of fuel jetted from the spray hole in synchronism with a change in amount of lift of the nozzle needle, i.e., the pressure pulsations, which improves the uniformity of the size of particles of the sprayed fuel.

In the preferred mode of the invention, the controller changes the amount of lift of the nozzle needle while keeping the spray hole opened to spray the fuel for the target injection duration. This minimizes the number of times the spray hole is closed, in other words, it minimizes the number of times the nozzle needle hits a needle seat formed on an inner wall of a body of the fuel injector, thereby slowing the deterioration of the fuel injector.

The controller determines a minimum amount of lift of the nozzle needle for the target injection duration so as to have a sectional area of a fuel flow path defined by the nozzle needle and the inner wall of the body of the fuel injector which is greater than a sectional area of an opening of the spray hole. Specifically, the spray hole serves as an orifice or throttle of the size enough to ignore throttling effects, as established by the clearance between the nozzle needle and the inner wall of the fuel injector, thereby resulting in dependency of the form of spraying of fuel on the throttling effects of the spray hole. This eliminates dependency of the shape of sprayed fuel on the center of a change in amount of lift of the nozzle needle, thereby resulting in a decrease in number of parameters needed to regulate the size of particles of the sprayed fuel and facilitating ease of achieving uniformity of the size of particles of sprayed fuel.

The controller changes the amount of lift of the nozzle needle in a cycle for the target injection duration and determines a cycle of a change in the amount of lift of the nozzle needle as a function of pressure of the fuel supplied to the fuel injector. The size of the particles of the sprayed fuel is controlled by the cycle of lift of the nozzle needle. The size of the particles depends upon the cycle of lift of the nozzle needle and the condition of a flow field, as expressed by, for example, the Reynolds's number. The condition of the flow field depends upon the pressure of the fuel. Accordingly, the control of the size of the particles is achieved based on the pressure of fuel supplied to the fuel injector.

The controller may alternatively determine the cycle of the change in the amount of lift of the nozzle needle as a function of the temperature of the fuel supplied to the fuel injector. The condition of the flow field also depends upon the temperature of the fuel. Accordingly, the control of the size of the particles is achieved based on the temperature of fuel supplied to the fuel injector.

The actuator of the fuel injector includes a piezoelectric device. The controller controls an electrical quantity of state of the piezoelectric device to change the amount of lift of the nozzle needle.

The internal combustion engine is a cylinder injection engine such as a diesel engine in which the spray hole is exposed directly to a combustion chamber of the engine. The size of the head of the fuel injector, therefore, depends upon the size or diameter of the combustion chamber. This results in a difficulty in installing any device in the fuel injector for creating the pressure pulsations of fuel therein. This problem is eliminated by changing the amount of lift of the nozzle needle cyclically to develop the pressure pulsations.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 4(a) is a view which demonstrates a sequence of on-off operations of a charge switch in FIG. 3;

FIG. 4(b) is a view which demonstrates a sequence of on-off operations of a discharge switch in FIG. 3;

FIG. 4(c) is a view which demonstrates a change in current flowing through the piezo-injector, as illustrated in FIGS. 1 and 2;

FIG. 4(d) is a view which demonstrates a change in voltage appearing at the piezo-injector, as illustrated in FIGS. 1 and 2;

FIG. 5 is a view which illustrates operating ranges of an internal combustion engine, as defined by load on and speed of the engine;

FIG. 6(a) is a view which shows atomized fuel jetted from the piezo-injector of FIG. 2 when the amount of lift of a nozzle needle is kept constant;

FIG. 6(b) is a view which shows atomized fuel jetted from the piezo-injector of FIG. 2 when a nozzle needle is oscillated vertically;

DESCRIPTION OF THE PREFERRED EMBODIMENTS

Figure 1:
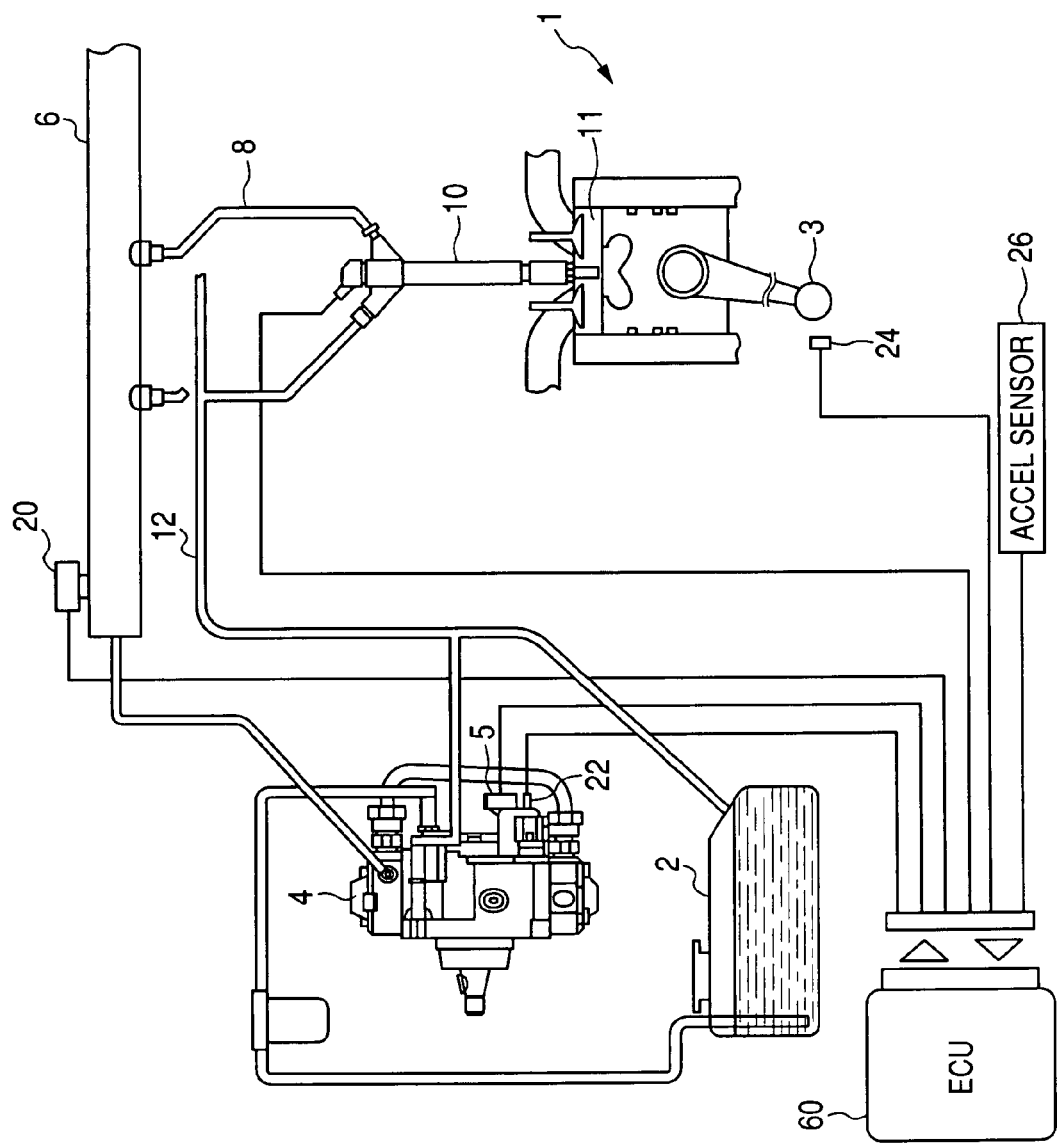
FIG. 1 is a schematic view which shows a common rail fuel injection system according to the first embodiment of the invention which is equipped with piezo-injectors.

Referring to the drawings, wherein like reference numbers refer to like parts in several views, particularly to FIG. 1, there is shown a fuel injection control system according to the first embodiment of the invention which is designed, as an example, as a common rail injection system which works to inject fuel into each cylinder of an internal combustion diesel engine.

The common rail fuel injection system includes generally a common rail 6, piezo-injectors 10, a high-pressure fuel pump 4, a suction control valve 5, and an electronic control unit (ECU) 60.

The high-pressure fuel pump 4 is driven by engine torque transmitted through a crankshaft 3 and works to pump fuel out of a fuel tank 2. The suction control valve 5 works to control the amount of fuel, as pumped from the fuel tank 2, and supply it to the common rail 6 at a controlled pressure. The common rail 6 works as an accumulator in which the fuel to be supplied to the piezo-injectors 10 through high-pressure fuel paths 8 is stored at a controlled high pressure required to inject the fuel into an internal combustion engine 1. Each of the piezo-injectors 10 has a top portion extending inside a corresponding one of combustion chambers 11 of the engine 1 to spray the fuel directly into the combustion chamber 11. Each of the piezo-injectors 10 is joined to a low-pressure fuel path 12 to drain the fuel to the fuel tank 2.

Figure 2:
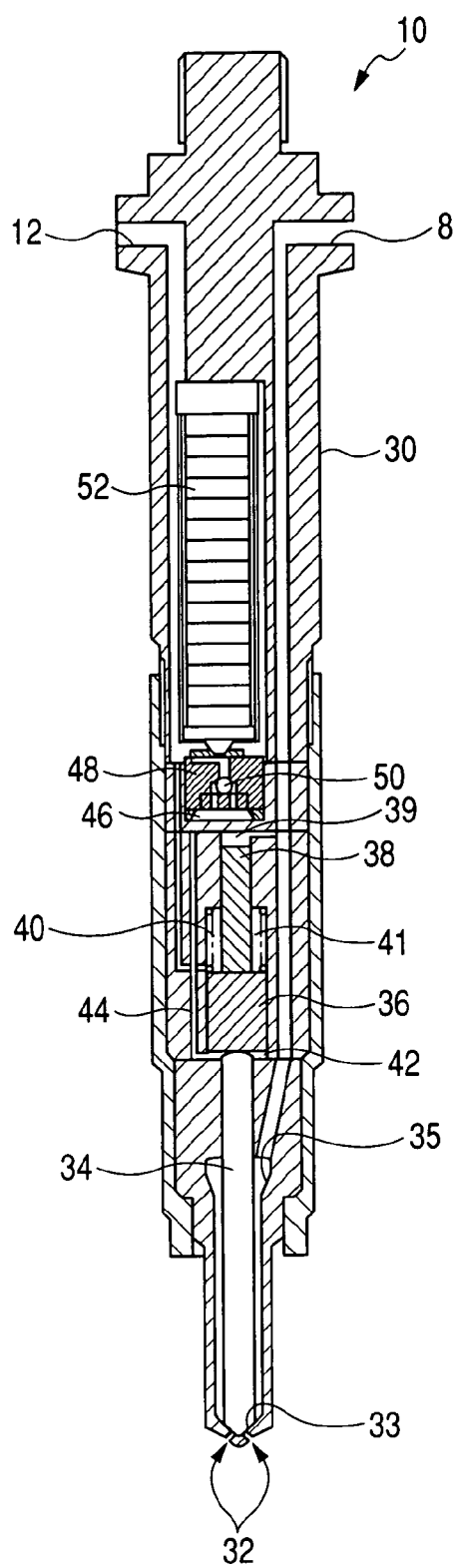
FIG. 2 is a longitudinal sectional view which shows an internal structure of each of the piezo-injectors of FIG. 1.

FIG. 2 illustrates an internal structure of each of the piezo-electric injectors 10.

The piezo injector 10 includes a body 30, a nozzle needle 34, a needle stopper 36, and a balance piston 38. The body 30 has spray holes 32 formed in a head thereof. The body 30 has formed on an inner wall thereof a needle seat 33 on which the nozzle needle 34 is to be seated. The nozzle needle 34, the needle stopper 36, and the balance piston 38 are disposed in alignment within an inner chamber of the body 30 to be movable along the inner wall of the body 30 in an axial direction (i.e., a longitudinal direction) of the body 30. The nozzle needle 34 and the inner wall of the body 30 define a needle chamber 35. The balance piston 38 defines a balance chamber 39 on a back side thereof. The needle chamber 35 and the balance chamber 39 communicate with the high-pressure fuel path 8 and are supplied with the high-pressure fuel.

A back pressure chamber 41 is defined by the back surface of the needle stopper 36 and the inner wall of the body 30. The back pressure chamber 41 communicates with the low-pressure fuel path 12 to be supplied with the low-pressure fuel. A spring 40 is disposed inside the back pressure chamber 41 to urge the needle stopper 36 frontward of the body 30.

A first hydraulic chamber 42 is defined hermetically by the front surface of the needle stopper 36 and the inner wall of the body 30. The first hydraulic chamber 42 communicates with a second hydraulic chamber 46 through a hydraulic path 44. The second hydraulic chamber 46 is defined within the body 30 behind the balance piston 39. The first hydraulic chamber 42, the hydraulic path 44, and the second hydraulic chamber 46 are filled with the fuel for transmission of hydraulic power.

The second hydraulic chamber 46 is a hermetical chamber defined by the front surface of the piezo-piston 48 and the inner wall of the body 30. The piezo-piston 48 has installed therein a check valve 50 which works to permit the fuel to flow only from the low-pressure fuel path 12 to the second hydraulic chamber 46. The piezo-piston 48 is joined at the back surface thereof to a piezoelectric device 52. The piezoelectric device 52 is joined at the back surface thereof to the body 30.

The piezoelectric device 52 includes a piezo stack made up of a plurality of piezoelectric elements which works to expand or contract with the aid of the inverse piezoelectric effect. Specifically, the piezoelectric device 52 is a capacitive load which functions as an injector actuator to expand when electrically charged and contract when discharged. The piezoelectric elements are made of piezoelectric material such as lead zirconate titaniate (PZT).

In operation, when electric current is applied to the piezoelectric device 52, so that it expands, it will cause the piezo-piston 48 to be moved downward, as viewed in FIG. 2, to elevate the pressure of fuel in the second hydraulic chamber 46, the hydraulic path 44, and the first hydraulic chamber 42. When the sum of pressure of fuel in the needle chamber 35 urging the nozzle needle 34 in the valve-opening direction (i.e., the upward direction, as viewed in FIG. 2) and pressure of fuel in the first hydraulic chamber 42 urging the needle stopper 36 in the valve-opening direction exceeds the sum of mechanical and hydraulic pressure, as produced by the spring 40 and the fuel in the back pressure chamber 41, urging the needle stopper 36 in the valve-closing direction (i.e., the downward direction, as viewed in FIG. 2) and pressure of fuel in the balance chamber 39 urging the back surface of the balance piston 38 in the valve-closing direction, it will cause the nozzle needle 34 to be lifted away from the needle seat 33 to open the spray holes 32.

Alternatively, when the piezoelectric device 52 is discharged, so that it contracts to move the piezo-piston 48 backward of the body 30, it will result in a drop in pressure of fuel within the second hydraulic chamber 46, the hydraulic path 44, and the first hydraulic chamber 42. When the sum of mechanical and hydraulic pressure, as produced by the spring 40 and the fuel in the back pressure chamber 41, urging the needle stopper 36 in the valve-closing direction and pressure of fuel in the balance chamber 39 urging the back surface of the balance piston 38 in the valve-closing direction exceeds the sum of pressure of fuel in the needle chamber 35 urging the nozzle needle 34 in the valve-opening direction and pressure of fuel in the first hydraulic chamber 42 urging the needle stopper 36 in the valve-opening direction, it will cause the nozzle needle 34 to be brought into abutment with the needle seat 33 to close the spray holes 32 to complete the injection of fuel into the engine 1.

Specifically, the amount of movement or lift of the nozzle needle 34 in the valve-opening direction is determined as a function of the amount of expansion stroke of the piezoelectric device 52. The amount of lift of the nozzle needle 34 is, thus, controlled accurately within a range of a zero position where the amount of lift of the nozzle needle 34 is zero (0) to a fully lifted position where the amount of lift of the nozzle needle 34 reaches a maximum.

Referring back to FIG. 1, the fuel injection control system also includes a fuel pressure sensor 20, a temperature sensor 22, a crank angle sensor 24, and an accelerator position sensor 26. The fuel pressure sensor 20 works to measure the pressure of fuel within the common rail 6 to provide a signal indicative thereof to the ECU 60. The temperature sensor 22 works to measure the temperature of fuel within the high-pressure fuel pump 4 to output a signal indicative thereof to the ECU 60. The crank angle sensor 24 works to measure an angular position of the crankshaft 3 of the engine 1 to output a signal indicative thereof to the ECU 60. The accelerator position sensor works to measure a driver's effort on or position of an accelerator pedal of the vehicle to output a signal indicative thereof to the ECU 60.

The ECU 60 includes a typical microcomputer and memories. The ECU 60 works to sample outputs from the above sensors to control operations of actuators such as the suction control valve 5 and the piezo-injectors 10 to control the output power of the engine 1. For instance, the ECU 60 monitors the position of the accelerator pedal and the speed of the engine 1 to determine a target pressure of the fuel in the common rail 6. The ECU 60 also monitors the position of the accelerator pedal and the speed of the crankshaft 3 to determine a target quantity of fuel to be injected by each of the piezo-injectors 10 into the engine 1. The ECU 60 determines a target injection duration for which the piezo-injector 10 are to be opened based on the pressure of fuel in the common rail 6 and the target quantity of fuel to be injected.

Figure 3:
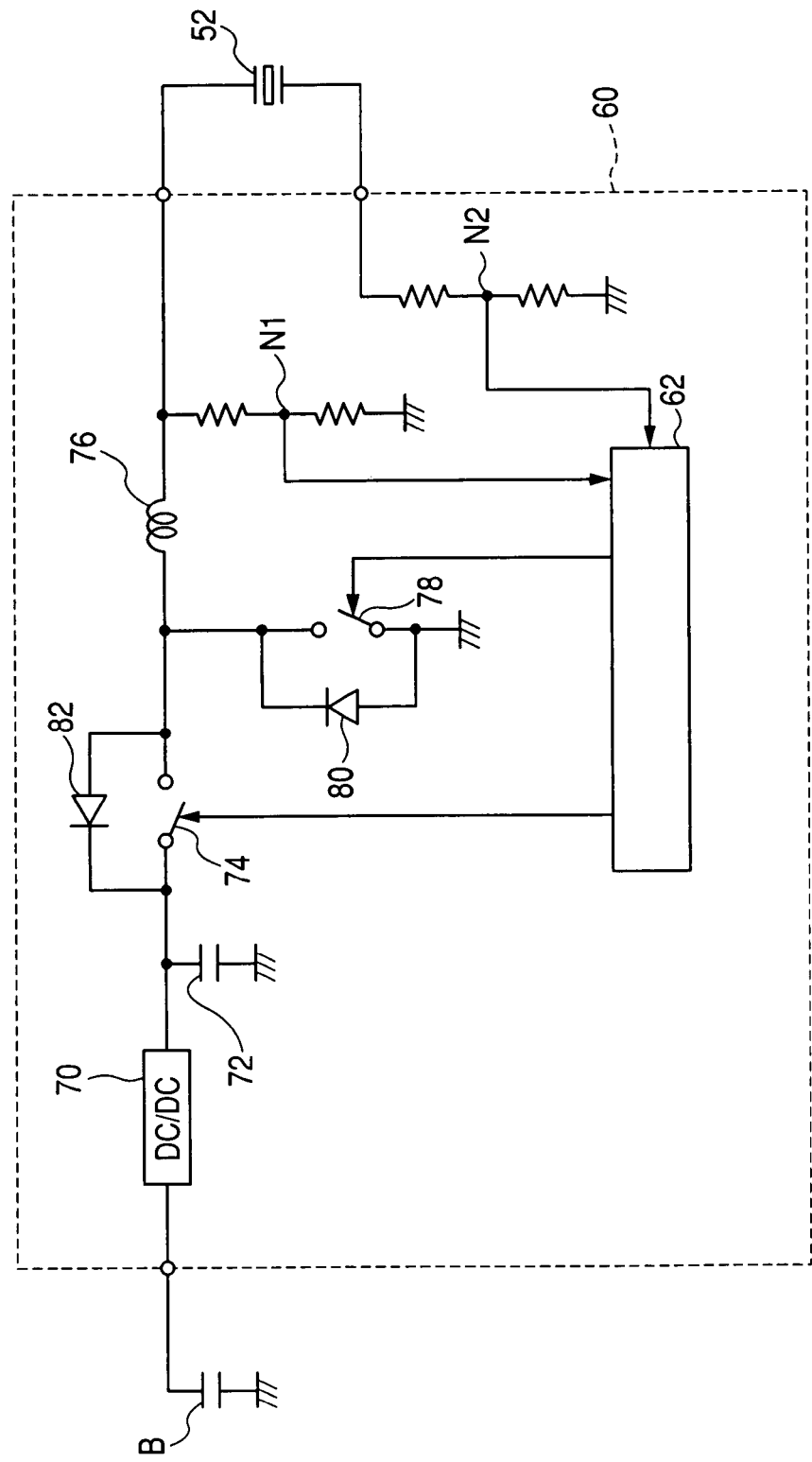
FIG. 3 is a circuit diagram which shows an internal structure of an electronic control unit of the fuel injection system of FIG. 1.

FIG. 3 illustrates a portion of an internal structure of the ECU 60 which is designed to control the operation of each of the piezo-injectors 10. The ECU 60 consists essentially of a piezo-injector driver and a microcomputer 62.

The piezo-injector driver is supplied with electrical power from an external battery B. Specifically, the power is first inputted to a step-up converter, i.e., a DC/DC converter 70. The DC/DC converter 70 works to step-up the voltage (e.g., 12V) of the battery B up to a level (e.g., 200 to 300V) required to charge the piezoelectric device 52 of each of the piezo-injectors 10.

The voltage stepped-up by the DC/DC converter 70 is applied to a capacitor 72. The capacitor 72 is connected at an end thereof to the DC/DC converter 70 and at the other end to ground. Upon application of the voltage, the capacitor 72 stores electrical energy or charges therein to activate the piezoelectric device 52.

The high-potential terminal of the capacitor 72 leading to the DC/DC converter 70 is connected to a high-potential terminal of the piezoelectric device 52 through a series circuit made up of a charge switch 74 and a charge/discharge coil 76. A low-potential terminal of the piezoelectric device 52 is connected to ground. A discharge switch 78 is connected at one of ends thereof to a junction of the charge switch 74 and the charge/discharge coil 76.

A diode 80 is connected to the discharge switch 78 in parallel thereto so as to have a forward direction from ground to the junction of the capacitor 72 and the charge/discharge coil 76. The diode 80 works as a freewheel diode and forms a chopper circuit together with the capacitor 72, the charge switch 74, and the charge/discharge coil 76 for charging the piezoelectric device 52.

The piezo-injector driver thus constructed is activated by the microcomputer 62. Specifically, the microcomputer 62 monitors the outputs from the sensors, as described above, indicating operating parameters of the engine 1, the voltage of the piezoelectric device 52, as sampled from a node N1, and the voltage of the piezoelectric device 52, as sampled from a node N2 and operates the charge switch 74 and the discharge switch 78 in the manner illustrated in FIGS. 4(a) to 4(d).

FIG. 4(a) represents the operation of the charge switch 74. FIG. 4(b) represents the operation of the discharge switch 78. FIG. 4(c) represents a change in controlled current flowing through the piezoelectric device 52. FIG. 4(d) represents a change in controlled voltage developed at the piezoelectric device 52.

In operation, the microcomputer 62 turns on and off the charge switch 74 in sequence to increase and decrease the current to charge the piezoelectric device 52 in the chopper mode. Specifically, the microcomputer 62 turns on the charge switch 74 to establish a closed loop made up of the capacitor 73, the charge switch 74, the charge/discharge coil 76, and the piezoelectric device 52, thereby charging the electrical energy stored in the capacitor 72 into the piezoelectric device 52. This causes the amount of current flowing through the piezoelectric device 52 to increase. Subsequently, the microcomputer 62 turns off the charge switch 74 to establish a closed loop made up of the charge/discharge coil 76, the piezoelectric device 52, and the diode 80, thereby charging the flywheel energy in the charge/discharge coil 76 into the piezoelectric device 52. This causes the amount of current flowing through the piezoelectric device 52 to decrease.

The microcomputer 62 operates the charge switch 74 in the step-down copper control mode, as described above, to charge the piezoelectric device 52, so that the potential developed at the high-potential terminal of the piezoelectric device 52 rises.

When it is required to discharge the piezoelectric device 52, the microcomputer 62 turns on and off the discharge switch 78 in sequence to increase and decrease the current to discharge the piezoelectric device 52 in the chopper mode. Specifically, the microcomputer 62 turns on the discharge switch 78 to establish a closed loop made up of the discharge switch 78, the charge/discharge coil 76, and the piezoelectric device 52, thereby releasing the electrical energy from the piezoelectric device 52. This causes the amount of current flowing through the piezoelectric device 52 to increase. Subsequently, the microcomputer 62 turns off the discharge switch 78 to establish a closed loop made up of the capacitor 72, the diode 82, the charge/discharge coil 76, and the piezoelectric device 52, thereby withdrawing the flywheel energy from the charge/discharge coil 76 to the capacitor 72.

The microcomputer 62 operates the discharge switch 78 in the step-up copper control mode, as described above, to discharge the piezoelectric device 52, so that the potential developed at the high-potential terminal of the piezoelectric device 52 drops.

The microcomputer 62 is designed to perform a constant on-duration operation which turns on the charge switch 74 or the discharge switch 78 for a predetermined period of time and then turns off it when the current flowing through the piezoelectric device 52 decreases to zero (0), thereby resulting in a constant speed at which the electrical energy in the piezoelectric device 52 changes. This permits the energy charged into the piezoelectric device 52 to be controlled accurately by controlling the duration for which the piezoelectric device 52 is charged in the constant on-duration operation. As long as the energy charged in the piezoelectric device 52 is constant, the amount of expansion thereof will be substantially constant regardless of the temperature thereof. The amount of lift of the nozzle needle 34 may, thus, be controlled accurately by the constant on-duration operation on the piezoelectric device 52. In contrast, when the charging of the piezoelectric device 52 is controlled on the basis of the voltage thereof, the amount of expansion of the piezoelectric device 52 will depend upon the temperature thereof, thus requiring a need for temperature-compensating for a target voltage at the piezoelectric device 52 to control the amount of lift of the nozzle needle 34 precisely. The fact that when the energy charged to the piezoelectric device 52 is constant, it will result in a constant amount of stroke of the piezoelectric device 52 is referred to in detail in Japanese Patent First Publication No. 2005-130561, the disclosure of which is incorporated herein by reference. The manner in which the amount of electrical energy to be charged to the piezoelectric device 52 per unit time is regulated to be constant by the chopper control mode, as described above, is taught in Japanese Patent First Publication No. 2002-13156, the disclosure of which is incorporated herein by reference.

It is usually advisable that the shape of spray of fuel from the piezo-injectors 10 be regulated in order to provide good output characteristics such as emission characteristics to the diesel engine 1. The shape of spray of fuel from the piezo-injectors 10 depends upon the diameter of the spray holes 32 and the pressure of fuel in the common rail 6. The pressure of fuel in the common rail 6 is a controllable parameter. The higher the pressure of fuel in the common rail 6, the smaller the size of particles of fuel sprayed by the piezo-injectors 10. Consequently, the shape of spray of fuel from the piezo-injectors 10 is preferably controlled by controlling the pressure of fuel in the common rail 6. This, however, encounters following difficulties.

FIG. 5 demonstrates operating ranges of the diesel engine 1, as defined by the speed of and load on the engine 1. The definitions of the ranges, constraints to which the control of pressure of fuel in the common rail 6 is subjected, and shape of spray of fuel from the piezo-injectors 10 will be described below.

The idle range is a range where the load on and speed of the engine 1 are low. Within such a range, the torque output and speed of the engine 1 are low. It is, thus, difficult to operate the high-pressure fuel pump 4 to raise the pressure of fuel in the common rail 6 up to a required level. It is usually desired to control the ignition lag and decrease the phase of pre-mixed combustion in order to reduce combustion noise, which requires the atomization of fuel sprayed from the piezo-injectors 10. The atomization is also desired in terms of reduction in emission of unburned fuel.

The start range is a fuel injection range between cranking of the engine 1 through a starter motor and reach to a given idle speed of the engine 1. The fuel injection range extends to a high-load range in which the load on the engine 1 is higher than that when the engine 1 is idling. The speed of the engine 1 is too low to drive the high-pressure fuel pump 4 to elevate the pressure of fuel in the common rail 6 up to a level required, for example, to ensure the reliability in operation of the fuel injection control system. It is, however, necessary to produce an atomized spray of fuel in terms of a quick start-up of the engine 1 or reduction in emission of unburned fuel.

The emission range is a range which most impinges on emission characteristics of the engine 1 when the vehicle is running, for example, the 10-15 mode. It is desired to minimize the pressure of fuel in the common rail 6 in terms of improvement of reliability of the common rail 6. It is, however, necessary to delivery an atomized spray of fuel to the engine 1 in terms of maintaining good exhaust emission characteristics of the engine 1.

The normal operating range is a range other than the three ranges, as described above, which is subjected to the same constraints and requirements as those in the emission range.

The full load range is a portion of the normal operating range in which the engine 1 is undergoing a maximum load. It is desired to minimize the pressure of fuel in the common rail 6 in terms of improvement of reliability of the common rail 6. It is, however, necessary to complete the injection of fuel into the engine 1 early in order to lower the temperature of exhaust emissions from the engine 1. This requires increasing the pressure of fuel in the common rail 6 to shorten the injection duration.

As apparent from the above discussion, it is essential to atomize the fuel to be sprayed into the engine 1, but however, the increasing of pressure of fuel in the common rail 6 required to atomize the fuel is subjected to some constraints. Even when it is possible to increase the pressure of fuel in the common rail 6 up to some level, the fuel injection control system will face the problem, as illustrated in FIG. 6(a). Specifically, the size of particles of fuel sprayed by the piezo-injectors 10, as described above, depends upon the diameter and length of the spray holes 32 and the pressure in the common rail 6. The higher the pressure in the common rail 6, the more enhanced the atomization of fuel sprayed from the piezo-injectors 10. This, however, results in an increase in distribution of particles of fuel sprayed. Consequently, even when a portion of the particles of fuel is made smaller in size than a desired upper limit, the remainder will be greater than it, which may lead to a reduction in exhaust emission characteristics of the engine 1.

Figure 7:
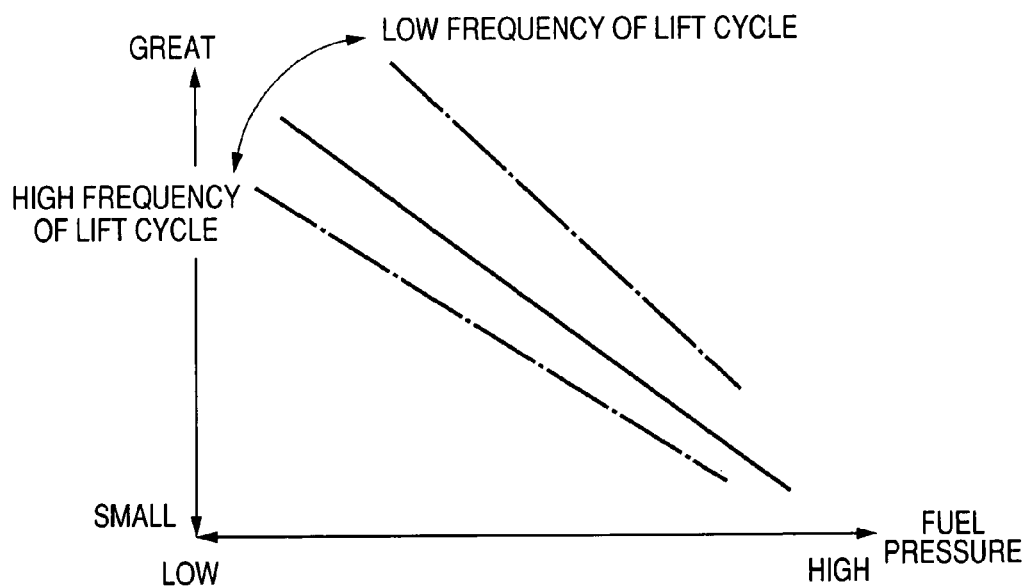
FIG. 7 is a graph which represents a relation among the frequency of a nozzle needle lift cycle, the pressure of fuel in a common rail, and the size of particles of fuel sprayed from the piezo-injector of FIG. 2.

In order to alleviate the above problem, the microcomputer 62, as illustrated in FIG. 6(b), works to oscillate the nozzle needle 34 vertically, that is, change the amount of lift of the nozzle needle 34 cyclically several times for a target injection duration to create pressure pulsations of fuel within each of the piezo-injectors 10. This enhances the liquid column break-up of fuel after jetted from the spray holes 32 in synchronism with a change in amount of lift of the nozzle needle 34, i.e., the pressure pulsations, thereby improving the uniformity of the size of particles of fuel sprayed from the piezo-injectors 10. More specifically, the microcomputer 62 keeps each of the piezo-injectors 10 open and changes the amount of lift of the nozzle needle 34 several times, that is, oscillates the nozzle needle 34 vertically in the target injection duration, thereby reducing the deterioration of the piezo-injectors 10 as compared with when the nozzle needle 34 is seated on the needle seat 33 completely in the injection duration. The microcomputer 62 also changes the cycle (will also be referred to as a lift cycle below) in which the amount of lift of the nozzle needle 34 is increased and then decreased to regulate the size of particles of fuel sprayed from the piezo-injectors 10. FIG. 7 demonstrates the relation among the frequency of the lift cycle, the pressure of fuel in the common rail 6, and the size of particles of fuel sprayed from the piezo-injectors 10. The relation shows that the higher the frequency of the lift cycle, the smaller the particles of fuel sprayed from the piezo-injectors 10.

Figure 8:
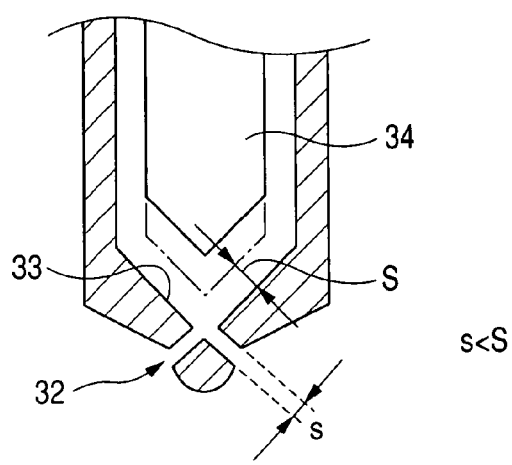
FIG. 8 is a partially sectional view which shows a relation between a sectional area S of a fuel flow path defined by a nozzle needle and a needle seat and a sectional area s of an opening of each of spray holes.

The microcomputer 62 determines a minimum amount of lift of the nozzle needle 34 in the lift cycle so that a sectional area S of a fuel flow path, as illustrated in FIG. 8, defined by the nozzle needle 34 and the needle seat 33 may be greater than a sectional area s of the opening of each of the spray holes 32. Specifically, the sectional area s of the spray holes 32 will be the smallest in a flow path through which the fuel is jetted from inside to outside the piezo-injector 10, so that the spray holes 32 serve as an orifice or throttle of the size enough to ignore throttling effects, as established by the clearance between the nozzle needle 34 and the needle seat 33. This eliminates the dependency of the shape of spray of fuel from the piezo-injectors 10 on the center of a change in amount of lift of the nozzle needle 34, thereby enabling the size of particles of the sprayed fuel to be regulated to a desired value as a function of the frequency of the lift cycle. In contrast, when the amount of lift of the nozzle needle 34 becomes minimum in the lift cycle, and the sectional area S of the fuel flow path defined by the nozzle needle 34 and the needle seat 33 is smaller than the sectional area s of the opening of each of the spray holes 32, it will cause the throttling effects, as established by the clearance between the nozzle needle 34 and the needle seat 33, to overcome those of the spray holes 32, thereby resulting in a great dependency of the shape of spray of fuel from the piezo-injectors 10 on the center of a change in amount of lift of the nozzle needle 34. This requires adjustment of the center of the change in amount of lift of the nozzle needle 34 to that required to achieve a desired shape of spray of fuel from the piezo-injectors 10 or control thereof precisely.

Figures 9A, 9B:
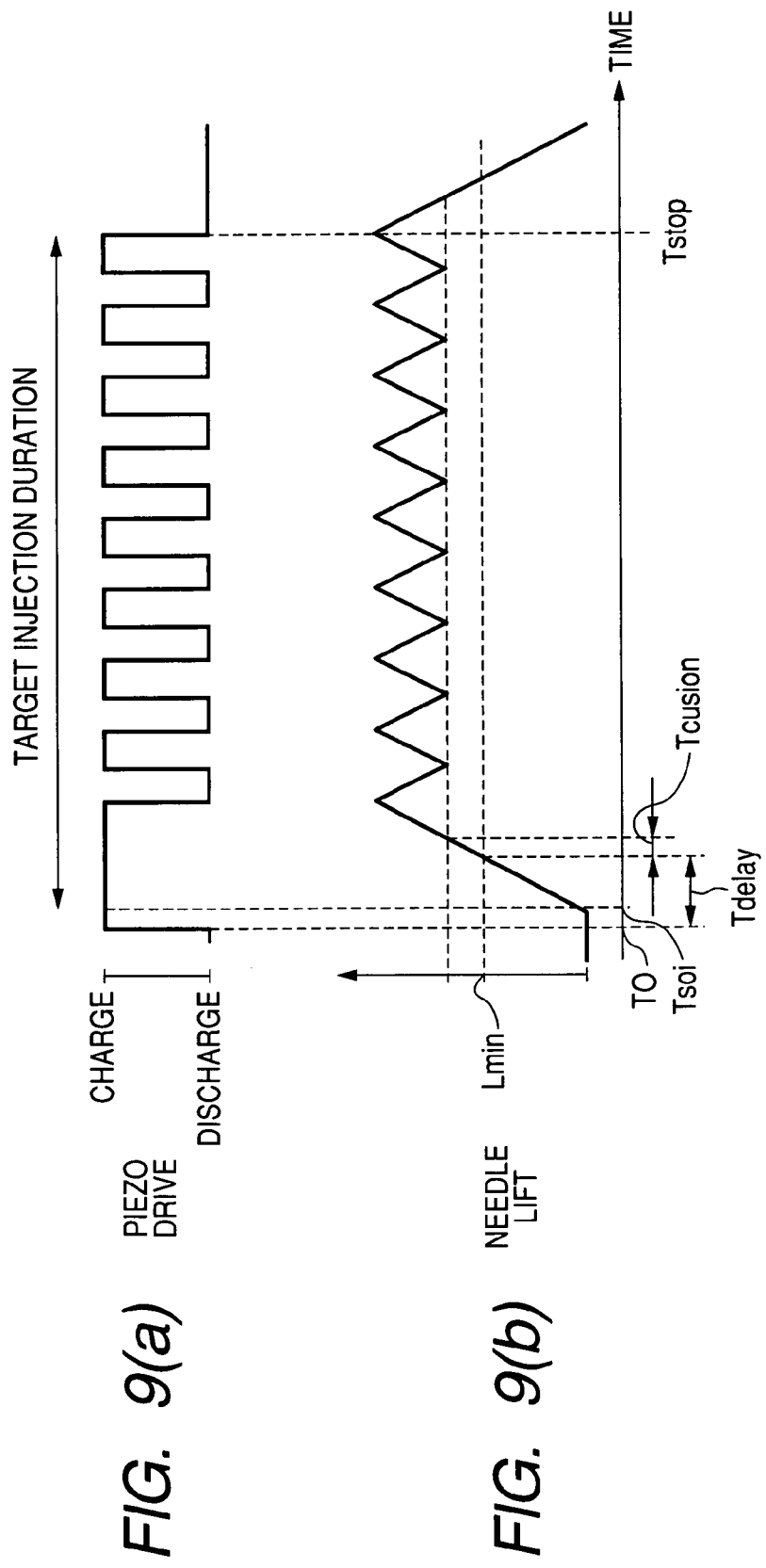
FIG. 9(a) is a view which shows a sequence of charge and discharge operations of a piezo-injector during a target injection duration.
FIG. 9(b) is a view which shows cyclic oscillations of a nozzle needle of a piezo-injector during a target injection duration.
Figure 10:
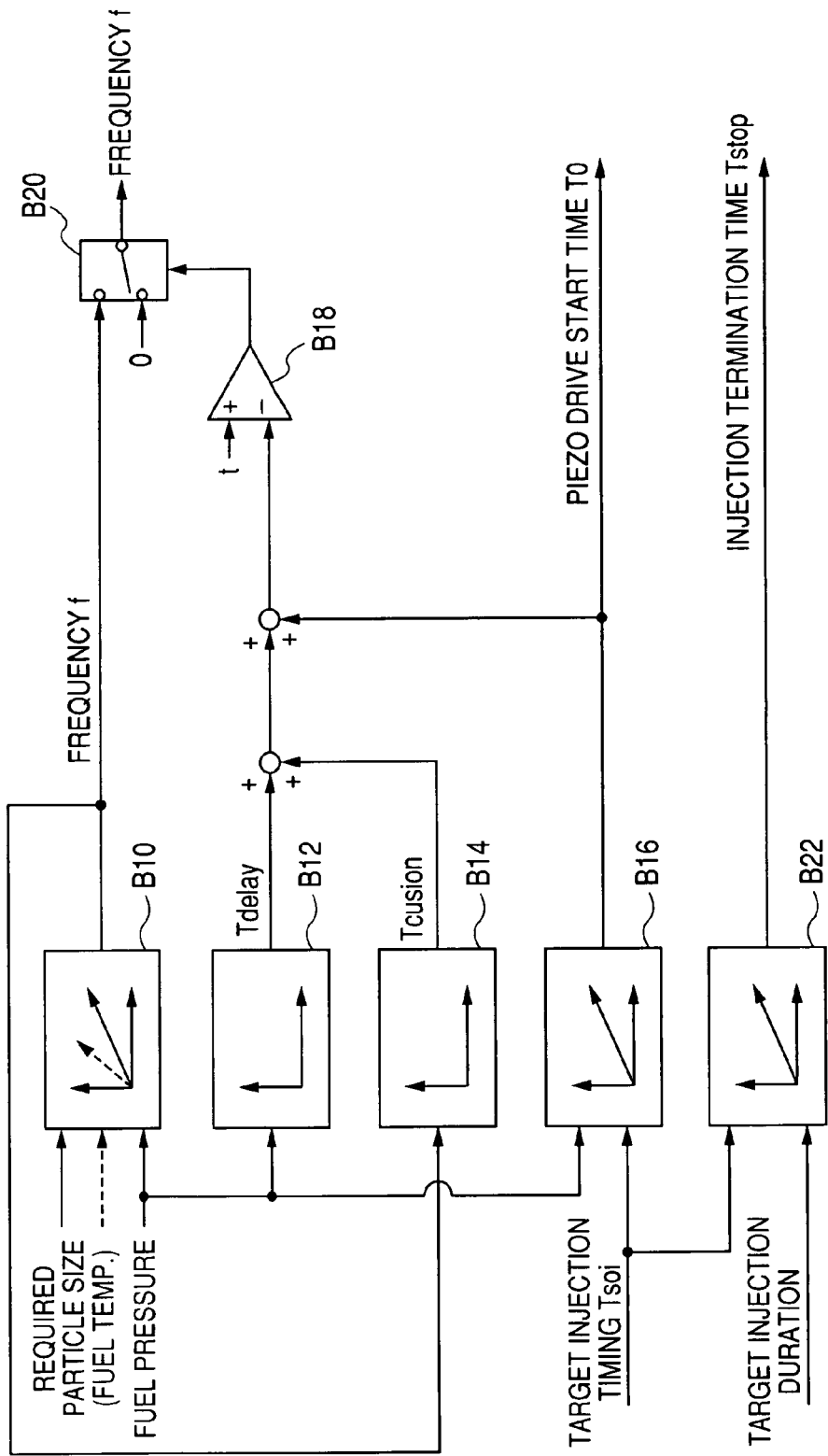
FIG. 10 is a functional block diagram of the electronic control unit of FIG. 3 for controlling oscillation of a nozzle needle of a piezo-injector.

Specifically, the microcomputer 62 is, as can be seen from FIGS. 9(a) and 9(b), designed to charge and discharge the piezoelectric device 52 of each of the piezo-injectors 10 cyclically for the target injection duration to change the amount of lift of the nozzle needle 34 at a desired frequency. FIG. 10 illustrates functional blocks in the microcomputer 62 to perform such a cyclic charge/discharge operation.

The microcomputer 62 has a frequency setting section B10, a lag time determining section B12, a margin determining section B14, a drive start time determining section B16, a comparator section B18, a selector section B20, and an injection termination time determining section B22.

The frequency setting section B10 works to set a frequency f of the lift cycle based on an actual pressure of fuel in the common rail 6, as measured by the fuel pressure sensor 20, and a required size of particles of fuel to be sprayed from the piezo-injectors 10. This is because the pressure in the common rail 6 and the size of particles of spray of fuel has the relation, as illustrated in FIG. 7. For example, the frequency setting section B10 determines the frequency f by look-up using a map. Specifically, the value of the frequency f is predetermined experimentally which is required to achieve a desired shape of spray of fuel to be produced by the piezo-injectors 10 as a function of the pressure in the common rail 6 and stored as the map in the microcomputer 62. The desired shape of spray of fuel is determined for each of the operating ranges of the engine 1.

The frequency f may alternatively be determined, as illustrated in FIG. 10, as a function of temperature of fuel, as measured by the temperature sensor 22. This is because the shape of spray of fuel, as produced by the piezo-injectors 10, also depends upon the condition of a flow field, as expressed by, for example, the Reynolds's number, and the viscosity of fuel is one of parameters other than the pressure of fuel which correlates with the condition of the flow field and depends upon the temperature thereof.

The lag time determining section B12 works to determine a lag time Tdelay that is, as indicated in FIG. 9(b), a period of time required for the amount of lift of the nozzle needle 34 to reach a minimum value Lmin (i.e., a lower limit) of a range in which the sectional area S of the fuel flow path defined by the nozzle needle 34 and the needle seat 33, as described above, is greater than the sectional area s of the opening of each of the spray holes 32. Specifically, the amount of electrical energy to be stored in the piezoelectric device 52, as described above, increases in proportion to the length of time the piezoelectric device 52 is charged. The amount of lift of the nozzle needle 34 is determined directly as a function of the amount of energy stored in the piezoelectric device 52. The energy stored in the piezoelectric device 52 and the amount of lift of the nozzle needle 34 depend upon an actual pressure of fuel in the common rail 6. Specifically, the energy to be charged into the piezoelectric device 52 for lifting the nozzle needle 34 to the minimum value Lmin depends upon the pressure of fuel in the common rail 6, meaning that the minimum value Lmin changes with a change in pressure in fuel in the common rail 6. The lag time determining section B12, therefore, determines the lag time Tdelay as a function of the pressure of fuel in the common rail 6 by look-up using a map listing a relation between the pressure of fuel in the common rail 6 and the time required to lift the nozzle needle 34 to the minimum value Lmin (i.e., the lag time Tdelay).

The margin determining section B14 works to determine a margin Tcusion, as indicated in FIG. 9(b), set between the minimum value Lmin and a minimum amount of lift of the nozzle needle 34 when being oscillated. The minimum amount of lift is the value which eliminates the possibility that the nozzle needle 34 moves downward below the minimum value Lmin. The determination of the margin Tcusion is made on the condition that the charge time and the discharge time for the piezoelectric device 52 are kept constant in the lift cycle in which the nozzle needle 34 is oscillated vertically. The initial velocity at which the piezoelectric device 52 is discharged increases as the voltage appearing at the piezoelectric device 52 immediately before being discharged rises. Therefore, decreasing of the frequency f of the lift cycle will result in an increase in time for which the piezoelectric device 52 is charged, which increases the voltage at the piezoelectric device 52, thus increasing the initial velocity of discharging of the piezoelectric device 52 so that the amount of contraction of the piezoelectric device 52, as developed by a one-time charging operation, will increase. Consequently, the margin determining section B14 determines the margin Tcusion as a function of the frequency f of the lift cycle.

The drive start time determining section B16 works to determine a drive start time T0, as shown in FIG. 9(b), at which the piezoelectric device 52 is to be activated to open the piezo-injector 10 based on a target injection timing Tsoi, as determined by the microcomputer 62, at which the piezo-injector 10 is to start spraying the fuel and an actual pressure of fuel in the common rail 6, as measured by the pressure sensor 20. The drive start time determining section B16 calculates, as the drive start time T0, the time that is the target injection timing minus a response time lag between start of charging the piezoelectric device 52 and actual opening of the nozzle needle 34. The response lag time changes as a function of the pressure of fuel in the common rail 6. The drive start time determining section B16, therefore, determines the drive start time T0 based on the target injection timing and the pressure of fuel, as measured by the pressure sensor 20.

The comparator section B18 works to compare the sum of the drive start time T0, the margin Tcusion, and the lag time lag Tdelay with a time t.

The selector section B20 is responsive to an output from the comparator section B18 to switch the value of an output thereof from zero (0) to the frequency f, as outputted from the frequency setting section B10, when the time t exceeds the sum of the drive start time T0, the margin Tcusion, and the lag time lag Tdelay.

The injection termination time determining section B22 works to determine an injection termination time Tstop that is the time at which the injection of fuel from the piezo-injectors 10 should be terminated based on the target injection timing Tsoi and the target injection duration.

As apparent from the above discussion, when the sum of the margin Tcusion and the time lag Tdelay has passed since the drive start time T0, the microcomputer 62 starts to change the amount of lift of the nozzle needle 34 cyclically, that is, oscillate the nozzle needle 34 in a cycle in an axial direction thereof. The charging of the piezoelectric device 52 may be made by turning on and off the charge switch 74 cyclically during the charge time, as determined by the frequency f of the lift cycle. This, however, requires increasing a switching frequency at which the charge switch 74 is turned on and off cyclically. It is, therefore, advisable that the charge switch 74 be turned on and off one time within the charge time. Specifically, within the charge time, as determined by the frequency f, the microcomputer 62 performs a switching operation one time which turns on the charge switch 74 to increase the current flowing through the piezoelectric device 52 gradually and then turns off it to decrease that current gradually. It is also advisable that an on-duration of the charge switch 74 be determined so that the time interval from start of charging the piezoelectric device 52 until the current flowing through the piezoelectric device decreases to substantially zero (0) matches with the above described charge time.

The fuel injection control system of this embodiment offers the following beneficial effects.

1. In the target injection duration for which the piezo-injectors 10 are opened, the nozzle needle 34 is moved up and down cyclically or oscillated several times, thereby enhancing the uniformity of the size of atomized particles of fuel jetted from the spray holes 32.
2. The nozzle needle 34 is oscillated while keeping the piezo-injector 10 opened, thereby resulting in a decrease in number of time the nozzle needle 34 is seated on the needle seat 33, which will slow the deterioration of the piezo-injectors 10.
3. The minimum amount of lift of the nozzle needle 34 in the lift cycle is determined so that the sectional area S of the fuel flow path defined by the nozzle needle 34 and the needle seat 33 is greater than the sectional area s of the opening of each of the spray holes 32, thereby facilitating control of the size of atomized particles of fuel sprayed from the piezo-injectors 10.
4. The lift cycle in which the amount of lift of the nozzle needle 34 is changed is determined as a function of the pressure of fuel in the common rail 6, thereby matching the frequency f with the pressure of fuel supplied to the piezo-injectors 10.
5. The lift cycle is determined as a function of the temperature of fuel supplied to the piezo-injectors 10, thereby matching the frequency f with the temperature of fuel.
6. The adjustment of the amount of lift of the nozzle needle 34 is achieved by controlling the amount of electrical energy charged into the piezoelectric device 52, thereby facilitating ease of controlling a cyclic change in amount of lift of the nozzle needle 34.
7. The diesel engine 1 is an internal combustion engine in which the fuel sprayed into the combustion chamber 11 is self-ignited, so that the output characteristics of the diesel engine 1 is sensitive to the size of particles of the sprayed fuel. The fuel injection control system of this embodiment is, thus, designed to change the amount of lift of the nozzle needle 34 cyclically, thereby facilitating control of the output of the engine 1. The diesel engine 1 is of a cylinder injection type in which the spray holes 32 of each of the piezo-injectors 10 are exposed directly to the combustion chamber 11, so the size of the head of the piezo-injectors 10 depends upon the size or diameter of the combustion chamber 11. This results in a difficulty in installing any device in the piezo-injectors 10 for creating the pressure pulsations of fuel therein. This problems is eliminated in the fuel injection control system of this embodiment by changing the amount of lift of the nozzle needle 34 cyclically to develop the pressure pulsations without increasing the size of the head of the piezo-injectors 10.

The fuel injection control system of the second embodiment will be described below.

The fuel injection control system is, unlike the first embodiment, designed to keep the amplitude of a cyclic change in amount of lift of the nozzle needle 34 constant regardless the frequency f of the lift cycle. This control is achieved by regulating the amount of lift of the nozzle needle 34 as a function of voltage appearing at the piezoelectric device 52 which represents an electrical quantity of state thereof.

Figure 11:
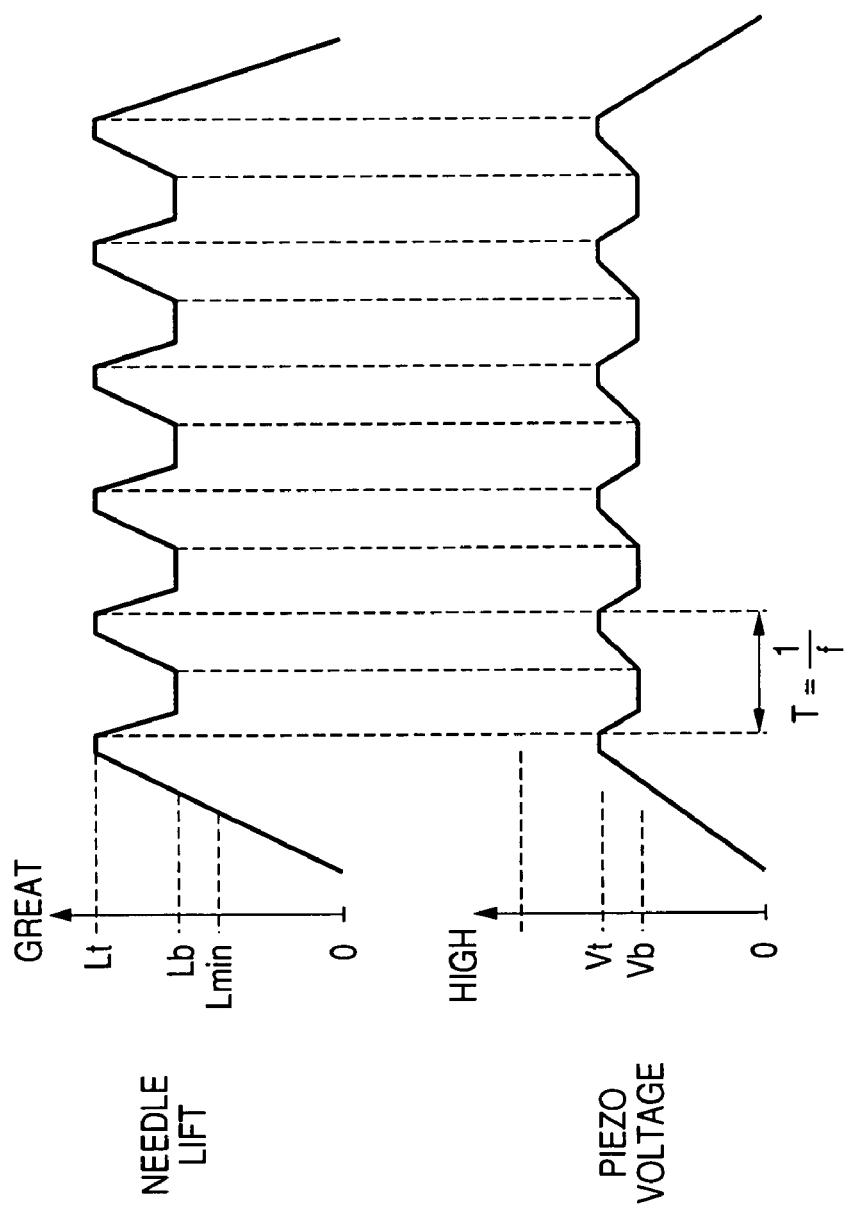
FIG. 11(a) is a view which shows cyclic oscillations of a nozzle needle of a piezo-injector according to the second embodiment of the invention.
FIG. 11(b) is a view which shows a change in voltage developed at a piezoelectric device of a piezo-injector arising from a sequence of charge and discharge operations thereof.

FIGS. 11(a) and 11(b) demonstrates a fuel injection control operation performed by the microcomputer 62 to control the amount of lift of the nozzle needle 34.

Upon entry to the needle lift control mode, as already described in the first embodiment, the microcomputer 62 oscillates the voltage appearing at the piezoelectric device 52 cyclically between an upper limit Vt and a lower limit Vb. The lower limit Vb is selected to keep the amount of lift of the nozzle needle 34 above the minimum value Lmin, as illustrated in FIG. 9(b). The amount of expansion of the piezoelectric device 52, as described above, depends upon the temperature thereof. The lower limit Vb is preferably determined to compensate for an error in the amount of lift of the nozzle needle 34 arising from a change in temperature of the piezoelectric device 52 to keep the nozzle needle 34 lifted up above the minimum value Lmin at all times during the lift cycle. The lower limit Vb may be changed as a function of a change in temperature of the piezoelectric device 52.

More specifically, the microcomputer 62 charges the piezoelectric device 52 until the voltage reaches the upper limit Vt, stops charging the piezoelectric device 52 until expiry of the charge time, that is, the end of a cycle T that is an reciprocal of the frequency f, discharges the piezoelectric device 52 until the voltage reaches the lower limit Vb, and then stop discharging the piezoelectric device 52 until the end of the discharge time within the cycle T. The microcomputer 62 performs such a sequence of charge/discharge operations to oscillate, as can be seen in FIG. 11(b), the nozzle needle 34 between a lower position Lb corresponding to the lower limit Vb and an upper position Lt corresponding to the upper limit Vt.

The fuel injection control system in each of the first and second embodiments may be modified, as discussed below.

Figure 12:
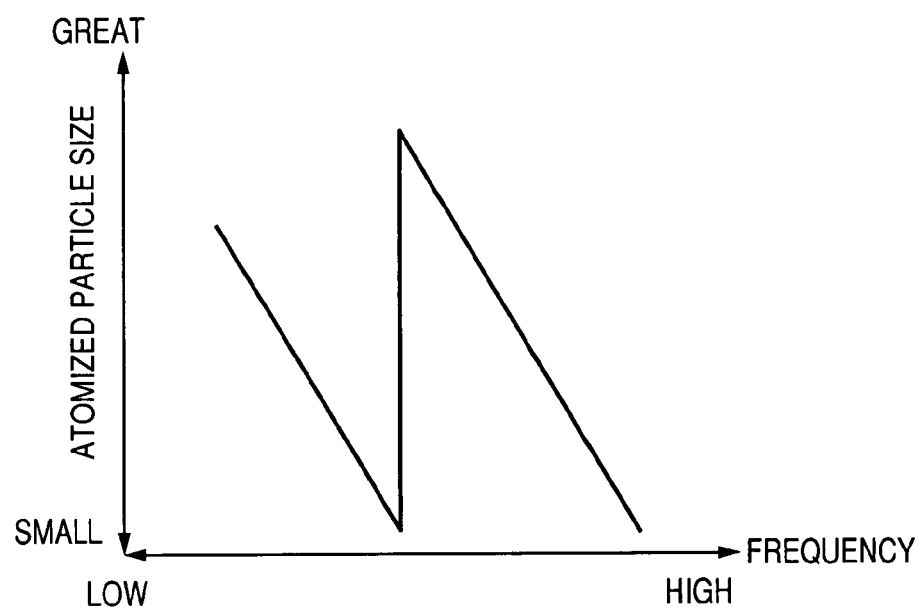
FIG. 12 is a graph which shows a relation between the size of atomized particles of fuel jetted from a piezo-injector.

In each of the first and second embodiments, the frequency f of the lift cycle is increased with a decrease in required size of atomized particles of fuel, as produced by the piezo-injectors 10. The frequency f, however, may be lowered based on the relation, as illustrated in FIG. 12, between the size of particles of fuel after sprayed from the piezo-injectors 10 and the frequency f for the purpose of atomizing the particles of fuel to be sprayed from the piezo-injectors 10. Specifically, decreasing of the frequency f will result in an increase in size of particles of fuel jetted from the spray holes 32, however, when the size of the particles of fuel increases above a certain degree, it will cause the particles after jetted from the spray holes 32 to broken up into a plurality of smaller particles. Using this phenomenon, the particles fuel after jetted from the spray holes 32 may be decreased in size.

The fuel injection control system in each of the first and second embodiments may alternatively be used to establish the uniformity of size of particles of fuel sprayed from the piezo-injectors 10 when it is required to increase it.

The piezoelectric device 52 may be charged or discharged in a manner other than the one illustrated in FIGS. 4(a) to 4(d). For example, the microcomputer 62 may be designed to turn off the charge switch 74 when the current flowing through the piezoelectric device 52 reaches a given value and then turned on it when the current decreases and reaches zero (0) to charge the piezoelectric device 52. The microcomputer 62 may alternatively be designed to control the electric power applied to the piezoelectric device 52 in a feedback mode to charge it in the same manner, as taught in Japanese Patent First Publication No. 2005-39990, the disclosure of which is incorporated herein by reference.

The chopper circuit working to charge or discharge the piezoelectric device 52 may be engineered to use the flyback current of a transformer, as taught in Japanese Patent First Publication No. 8-177678, the disclosure of which is incorporated herein by reference. The charging or discharging of the piezoelectric device 52 may alternatively be made in any manner other than the chopper control.

The nozzle needle 34 may alternatively be oscillated in a manner other than the one illustrated in FIGS. 9(a) and 9(b) or FIGS. 11(a) and 11(b). For instance, the microcomputer 62 may be designed to oscillate the nozzle needle 34 along a sine curve or at irregular intervals. The microcomputer 62 may also be designed to determine the amount of lift of the nozzle needle 34 in terms of adjustment of the injection rate of the piezo-injectors 10 and oscillate the nozzle needle 34 above the minimum value Lmin, thereby facilitating control of the size of atomized particles of fuel with high accuracy. The microcomputer 62 may oscillate the nozzle needle 34 across the minimum value Lmin. This also improves the uniformity of the size of atomized particles of fuel.

Figure 13:
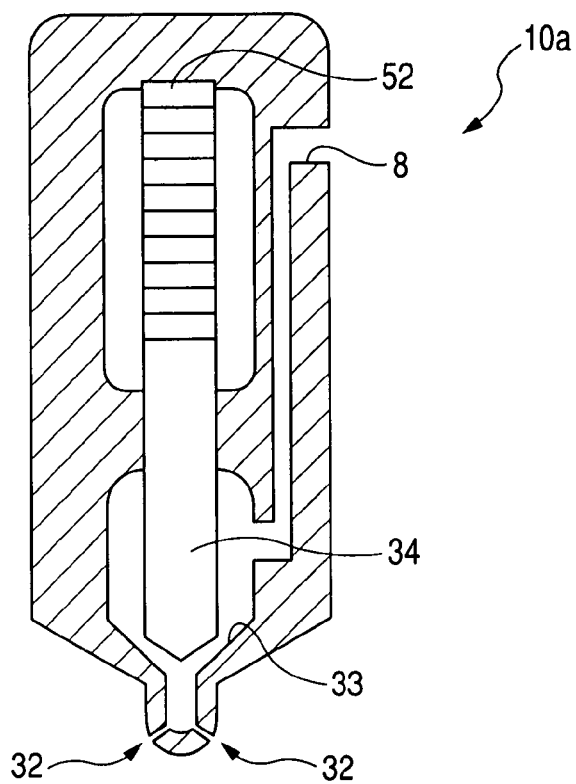
FIG. 13 is a longitudinal sectional view which shows another type of piezo-injector which may be employed in the fuel injection system of FIG. 1.

The fuel injection control system may employ piezo-injectors 10a, as illustrated in FIG. 13. In FIG. 13, the same reference numbers as employed in FIG. 2 refer to the same parts. The piezo-injector 10a has the piezoelectric device 52 connected directly to the nozzle needle 34, thereby ensuring the transmission of a stroke of the piezoelectric device 52 to the nozzle needle 34 without a response lag arising from absorber action of the fuel, like in the piezo-injectors 10 of FIG. 2.

The piezo-injector 10a is of a normally open type in which when the piezoelectric device 52 is charged, the spray holes 32 are closed, and when the piezoelectric device 52 is discharged, the spray holes 32 are opened. The piezo-injector 10a may alternatively be designed as a normally closed type to have a U-shaped connector disposed between the piezoelectric device 52 and the nozzle needle 34 so as to permit the piezoelectric device 52 to expand backward of the body of the piezo-injector 10 to open the spray holes 32.

The fuel injection control system may alternatively employ fuel injectors equipped with a stepper motor works as an actuator to move the nozzle needle 34 stepwise instead of the piezoelectric device 52.

The fuel injection control system may alternatively be designed to control a gasoline engine instead of the diesel engine 1. In case of a cylinder injection type, the output characteristics of the engine are sensitive to the size of particles of fuel sprayed thereinto, thus achieving a great deal of the beneficial effects, as described above. The cylinder injection type, as described already, requires the fuel injectors to have the spray holes exposed directly to the combustion chamber, so that the size of the head of the fuel injectors depends upon the size or diameter of the combustion chamber. This results in a difficulty in installing any device in the piezo-injectors 10 for creating the pressure pulsations of fuel therein. This problem is eliminated in the fuel injection control system of the invention by changing the amount of lift of the nozzle needle 34 cyclically to develop the pressure pulsations without increasing the size of the head of the piezo-injectors 10.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

What is claimed is:

1. A fuel injection apparatus for an internal combustion engine comprising:
   a fuel injector equipped with an actuator and a nozzle needle, the actuator working to lift the nozzle needle to inject fuel into an internal combustion engine; and
   a controller working to control an operation of the actuator to change an amount of lift of the nozzle needle a given number of times for a target injection duration;
   wherein said controller changes the amount of lift of the nozzle needle while keeping a spray hole opened to spray the fuel for the target injection duration, wherein said controller determines a minimum amount of lift of the nozzle needle for the target injection duration so as to have a sectional area of a fuel flow path defined by the nozzle needle and an inner wall of a body of said fuel injector which is greater than a sectional area of an opening of the spray hole, wherein said controller changes the amount of lift of the nozzle needle in a cycle for the target injection duration and determines a cycle of a change in the amount of lift of the nozzle needle as a function of a pressure of the fuel supplied to said fuel injector, and wherein said controller changes the amount of lift of the nozzle needle in a cycle for the target injection duration and determines a cycle of a change in the amount of lift of the nozzle needle as a function of a temperature of the fuel supplied to said fuel injector.

2. A fuel injection apparatus as set forth in claim 1, wherein the actuator of said fuel injector includes a piezoelectric device, and wherein said controller controls an electrical quantity of a state of the piezoelectric device to change the amount of lift of the nozzle needle.

3. A fuel injection apparatus as set forth in claim 1, wherein the internal combustion engine is a cylinder injection engine.

4. A fuel injection apparatus as set forth in claim 3, wherein the cylinder injection engine is a diesel engine.

* * * * *